United States Patent
Holt

(10) Patent No.: US 6,389,735 B1
(45) Date of Patent: May 21, 2002

(54) METHOD AND APPARATUS FOR MODIFYING THE BEHAVIOR OF AQUATIC SPECIES WITH ELECTRICAL FIELDS

(76) Inventor: Steven P. Holt, 4929 Mountain Ridge, NE., Ada, MI (US) 49301

( * ) Notice: Subject to any disclaimer, the term of this patent is extended or adjusted under 35 U.S.C. 154(b) by 0 days.

(21) Appl. No.: 09/518,571

(22) Filed: Mar. 3, 2000

Related U.S. Application Data

(60) Provisional application No. 60/122,626, filed on Mar. 3, 1999.

(51) Int. Cl.$^7$ .............................................. A01K 85/01
(52) U.S. Cl. ........................ 43/17.1; 340/573.2; 324/72
(58) Field of Search ............................... 43/17.1, 42.31; 119/220; 324/71.1, 72, 457; 340/573.2, 573.1, 850, 984; 455/40, 41

(56) References Cited

U.S. PATENT DOCUMENTS

| | | | | |
|---|---|---|---|---|
| 2,577,229 A | | 12/1951 | Carnes ..................... 340/393.2 |
| 2,757,475 A | | 8/1956 | Pankove ..................... 42/17.1 |
| 2,784,399 A | | 3/1957 | Smith ..................... 340/388.7 |
| 2,808,674 A | * | 10/1957 | Vang ........................... 43/17.1 |
| 2,920,318 A | | 1/1960 | Balcken et al. .......... 340/393.2 |
| 2,932,110 A | | 4/1960 | Kilpinen et al. .............. 43/17.1 |
| 2,939,240 A | | 6/1960 | Goodman ....................... 43/17 |
| 3,105,233 A | | 9/1963 | D'Amore et al. ...... 340/815.69 |
| 3,120,073 A | | 2/1964 | Brunton ....................... 43/17.1 |
| 3,310,902 A | | 3/1967 | Godby ......................... 43/17.1 |
| 3,416,254 A | | 12/1968 | Bornzin ....................... 43/17.1 |
| 3,683,356 A | | 8/1972 | D'Amore ..................... 43/17.1 |
| 3,693,276 A | * | 9/1972 | Kurc ........................... 43/17.1 |
| 3,797,459 A | * | 3/1974 | Harris ......................... 43/17.1 |
| 3,855,721 A | * | 12/1974 | Strader ...................... 43/42.32 |
| 3,885,338 A | | 5/1975 | York ........................... 43/17.1 |
| 4,417,301 A | * | 11/1983 | Newman ..................... 43/17.1 |
| 4,583,313 A | | 4/1986 | Dugan, Jr. ................... 43/17.1 |
| 4,625,447 A | * | 12/1986 | Buchanan ................... 43/17.1 |
| 4,646,276 A | * | 2/1987 | Kowalewski et al. ....... 367/139 |
| 4,805,339 A | | 2/1989 | Fuentes et al. ............. 43/42.31 |
| 4,835,721 A | | 5/1989 | Becker et al. .............. 708/250 |
| 4,932,007 A | | 6/1990 | Suomala ..................... 43/17.1 |
| 4,955,005 A | | 9/1990 | Loeffelman ................. 43/17.1 |
| 5,046,278 A | * | 9/1991 | Szilagyi et al. .............. 43/17.1 |
| 5,099,455 A | | 3/1992 | Parra .......................... 367/120 |
| 5,117,572 A | | 6/1992 | Parra .......................... 43/17.1 |
| 5,134,592 A | | 7/1992 | Parra ........................... 43/9.2 |

(List continued on next page.)

FOREIGN PATENT DOCUMENTS

| | | | |
|---|---|---|---|
| DE | 19512031 B1 | * | 10/1996 |
| EP | 631721 B1 | * | 1/1995 |
| GB | 2333431 A1 | * | 7/1999 |
| WO | WO 96/37099 A1 | * | 11/1996 |

OTHER PUBLICATIONS

Text entitled "The Behavior of Teleost Fishes", edited by Tony J. Pitcher, 1986, John Hopkins Unversity Press; Chapter 5, Underwater Sound and Fish Behaviour (pp. 114–151); Chapter 7.
Role of Lateral Line in Fish Behavior (pp. 177–202).

*Primary Examiner*—Darren W. Ark
(74) *Attorney, Agent, or Firm*—McGarry Bair LLP

(57) ABSTRACT

A device and a method are provided for reproducing complex electrical fields associated with aquatic species as they exist in nature, for the purpose of altering the behavior of like or unlike aquatic species. An aquatic species is selected for observation and isolated from other species to avoid interference. At least one of an attribute and a observable behavior of the isolated species is recorded as well as an electrical field signature associated with the isolated species. In another aspect, a method is provided for identifying a particular aquatic species in an unisolated environment according to a particular electrical field signature generated by various aquatic species.

20 Claims, 10 Drawing Sheets

U.S. PATENT DOCUMENTS

| | | | |
|---|---|---|---|
| 5,168,471 A | 12/1992 | Parra | 367/99 |
| 5,168,473 A | 12/1992 | Parra | 367/124 |
| 5,168,474 A | 12/1992 | Parra | 367/124 |
| 5,175,950 A | 1/1993 | Linder | 43/17.1 |
| 5,177,891 A | 1/1993 | Holt | 43/17.1 |
| 5,251,187 A | 10/1993 | Parra | 367/139 |
| 5,282,178 A | 1/1994 | Hill et al. | 43/17.1 |
| 5,307,052 A * | 4/1994 | Harrison et al. | 340/573.2 |
| 5,327,854 A * | 7/1994 | Smith et al. | 119/220 |
| 5,349,774 A | 9/1994 | Parra | 43/9.2 |
| 5,697,182 A * | 12/1997 | Rodgers | 43/17.1 |
| 6,058,763 A * | 5/2000 | Shedd et al. | 119/220 |
| 6,170,436 B1 * | 1/2001 | Goodson et al. | 43/17.1 |

* cited by examiner

Sample Data Structure

Species Name

Species Attribute Data:
- Size
- Color

Visible Behavior Data:
- Attacking
- Fleeing
- Feeding

Radiation Data:

METHOD AND APPARATUS FOR MODIFYING THE BEHAVIOR OF AQUATIC SPECIES WITH ELECTRICAL FIELDS

CROSS-REFERENCE TO RELATED APPLICATIONS

This application claims the benefit of U.S. patent application Ser. No. 60/122,626 filed Mar. 3, 1999.

BACKGROUND OF THE INVENTION

1. Field of the Invention

This invention relates to aquatic species. In one of its aspects, the invention relates to a method of recording the behavior of aquatic species. In another of its aspects, the invention relates to modifying the behavior of aquatic species. In yet another of its aspects, the invention relates to an article for modifying the behavior of aquatic species. In still another of its aspects, the invention relates to an apparatus for modifying the behavior of aquatic species.

2. Description of the Related Art

Fish are well known to possess highly developed sense organs for the purpose of detecting complex underwater sounds and vibrations. Through a related sense organ, many fish and other aquatic species can also detect, as well as generate electrical fields about them and in some cases can detect them from considerable distances. There is evidence that fish are able to detect not only static electric fields but are further able to discriminate complex modulations of surrounding electric fields from other like and unlike aquatic animals. These complex patterns in the electrical fields are recognized as distinct "signatures" in relationship to other aquatic organisms. Such discrimination of complex patterns appears to play an important role in fish communication as well as a number of other behaviors including forage identification and location, hunting and feeding behavior, danger signals, patterns associated with injured or distressed prey, social behaviors, shoaling, reproductive behaviors, and perhaps migration.

A number of attempts have been made to take advantage of the behavior modifying potential of electric fields and electromotive forces. An example is disclosed in U.S. Pat. No. 5,175,950 issued to Linder in 1993. Linder discloses a fishing lure that generates an electromagnetic field intended to "closely resemble the electromagnetic field naturally emitted by fish." The problem with this approach is that Linder's devices are incapable of reproducing the complex modulations in electrical or electromagnetic fields that are recognized as distinct behavior modifying patterns as they occur in nature. Electrical fields are not static in living organisms. While some basic "charge" may be assigned to a living aquatic organism, very small but distinct and unique changes occur due to depolarizations within the animals' cells; most notably as a result of nerve and muscle depolarization, heartbeats, or by the organisms inherent ability to change its electrical field in response to an external stimulus.

SUMMARY OF THE INVENTION

According to the invention, a method for recreating complex and changing electrical fields representative of those detected underwater in the context of specific behavior modifying events of underwater species, comprises the steps of selecting an aquatic species to observe, observing and digitally recording certain characteristics of the selected species and then correlating them with the behavior and electrical field data in the vicinity of the species.

Further according to the invention, an article or apparatus for recreating complex and changing electrical fields representative of those detected underwater in the context of specific behavior modifying events of underwater species comprises a data structure which has digital records of certain visible behavior of a selected species correlated with electrical field data of the visible behavior of the species. In one embodiment, the data structure is embodied into a chip which is mounted into a sealed housing which also includes a circuit to periodically read the data in the data structure and to generate a signal representative of the changing electrical fields related to a certain type of behavior of the underwater species and an electrical pole or poles (electrodes) which is/are responsive to the signal to recreate the electrical or electromagnetic field signature either within or outside of the housing, and within the aquatic environment. The chip can be in the form of a plug which can be interchangeable in the sealed housing to accommodate different data structures in the housing as desired. In a preferred embodiment, the sealed housing is in the form of a fishing lure and has hooks attached to it. In another embodiment, the data structure is incorporated into a read only memory in a computer that can be carried by a watercraft. The apparatus further comprises an electrode or electrodes which is/are connected to the computer to detect electrical field signatures in the vicinity of an underwater species and the computer includes a comparator to compare the detected electrical field patterns or "signatures" with the electrical field signatures stored in the data structure. The apparatus further includes an output device to identify those species for which the detected electrical field signatures match the electrical field signatures in the data structure. In one further embodiment of the invention, the computer has circuitry to read the data structure and to generate signals representative of certain electrical field signatures of a particular underwater species and to apply the thus generated signals to an underwater electrode or electrodes to recreate the electrical field signature of a desirable species underwater.

In yet another embodiment of the invention, behavior modifying electrical field patterns are "discovered" by placing an electrode(s) in an underwater environment in the vicinity of a desired species of aquatic organism(s). Electromotive potentials are applied to the electrode(s) in either randomly selected or in predefined patterns representing modulated pulses to the electrode(s) and thereby resulting in a changing underwater electrical field in the vicinity of the electrode(s) and the study organism(s). Different applied patterns of pulses over time and/or changes in the magnitude of electrical field forces are experimentally applied until a modification in behavior of the study organism(s) is observed. The behavior change may be any of a number of observations as previously described. Once a certain behavior response is observed, it is recorded in association with the indices defining the electrical field signal pattern being applied at the time that the change in behavior was observed. These indices are then used to confirm the behavior modifying influence when the same electrical field signal pattern is re-created in the presence of like organisms. The indices associated with this behavior modification are stored in a digital or analog memory and applied in an like manner to the naturally occurring "signatures" recorded above. These "artificial" electrical field patterns can be used in conjunction with or instead of the natural electrical field signatures.

In addition, various species of aquatic organisms can be identified in a database containing identifying electric field signature information. In one aspect of the invention a method is provided for identifying a particular aquatic species in an unisolated environment according to a particular electrical field signature generated by various aquatic species comprising the steps of measuring data representative of the electrical field generated by the particular aquatic species; looking up the measured data representative of the electrical field in a database, wherein the database has a first index which cross-references a list of aquatic species with a corresponding list of unique electrical field data; and reporting any matches of the measured data representative of the electrical field found in the database to a user.

BRIEF DESCRIPTION OF THE DRAWINGS

Reference is now made to the accompanying drawings in which.

DESCRIPTION OF THE PREFERRED EMBODIMENTS

Figure 6:
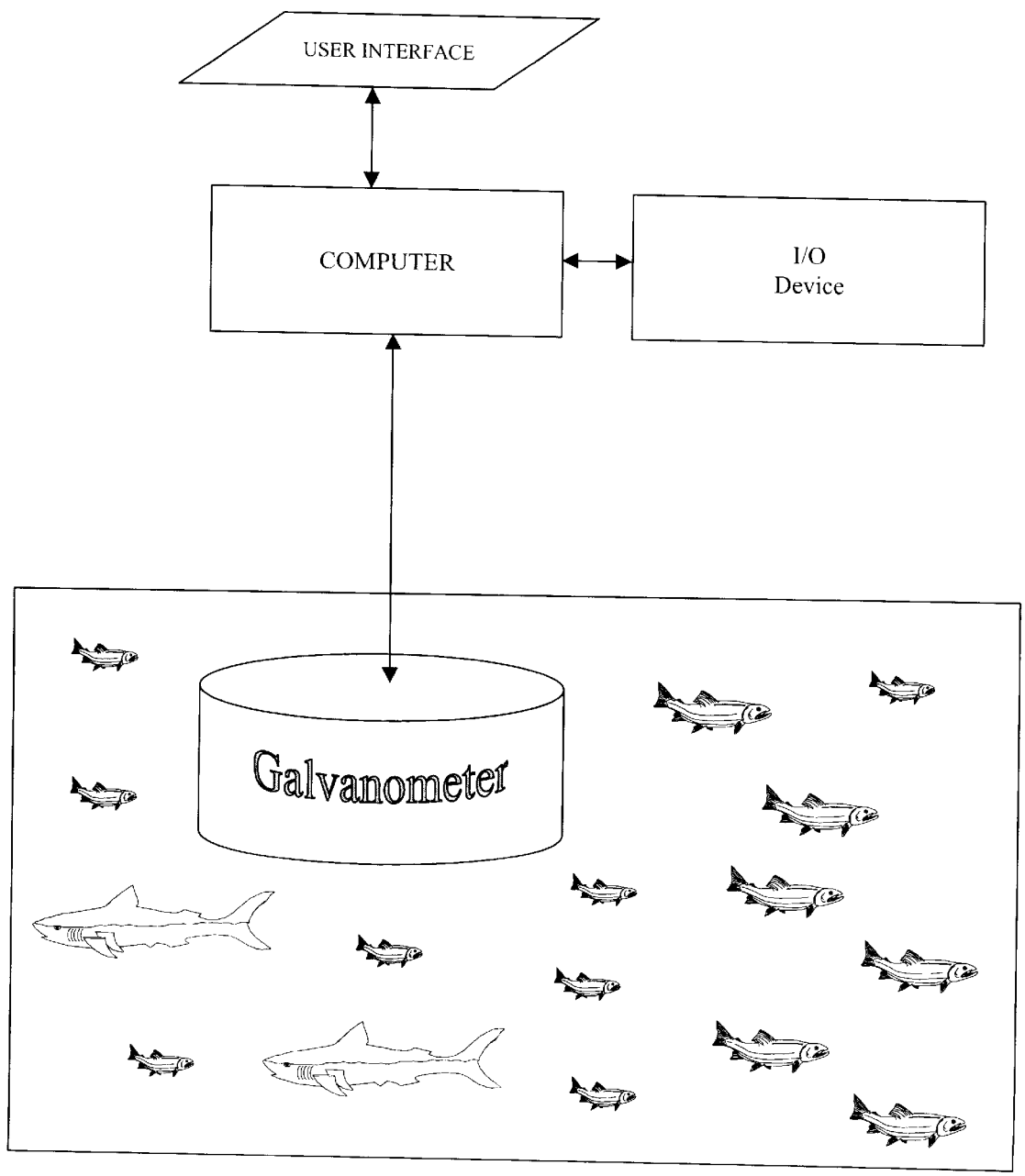
FIG. 6 is a schematic representation of an apparatus according to the invention.

Now referring to FIGS. 1–4 and 6, flowchart diagrams and an illustration depicting the logical flow of and apparatus for recording the various attributes of a selected species in accordance with the present invention are illustrated therein. First, select an aquatic species to observe. Next, isolate the selected species in the vicinity of a very sensitive galvanometer (as illustrated in FIG. 6). The instrument is capable of recording subtle changes in the surrounding electrical field and records the indices defining those changes over time. The recordings may be taken in the presence of any single organism, or any group of organisms, like or unlike. Observe and digitally record certain visible characteristics of the selected species and then correlate them with the visual behavior and electrical field data of the species. These initial observations may serve to later explain unexpected distinctions among several members of the same species or varying species. The visual observations may include the size, shape or even color of the animal. Any or all of these physical attributes may affect the species' electrical field signature.

The above mentioned galvanometer recordings may also be recorded in the context of an organism engaged in some specific behavior, activity, or event. Such situations might include the recording of defensive posturing, heartbeat patterns, fleeing, pursuit, swimming, stationary posture, injured prey, a predator pursuing or consuming prey, reproductive behavior, shoaling, and other social behaviors. In fact, a recorded electrical field signature may represent the collective electrical fields of many like and unlike organisms at the same time, and may represent the collective electrical field signatures of certain events such as feeding, reproductive behavior, shoaling, social behavior, predators in pursuit of prey, feeding frenzies, etc.

It will prove worthwhile to record the visual behavior that is being observed in addition to recording the electrical field signature corresponding to the visual behavior. Doing so will enhance the ability to quickly locate and reproduce a desired signature once stored in a database or similar storage structure. Although the flowcharts depict this as a sequential event with the visual behavior being recorded prior to the electrical field signature, it should be understood that the two tasks can be accomplished simultaneously or in reverse order as well.

Figure 1:
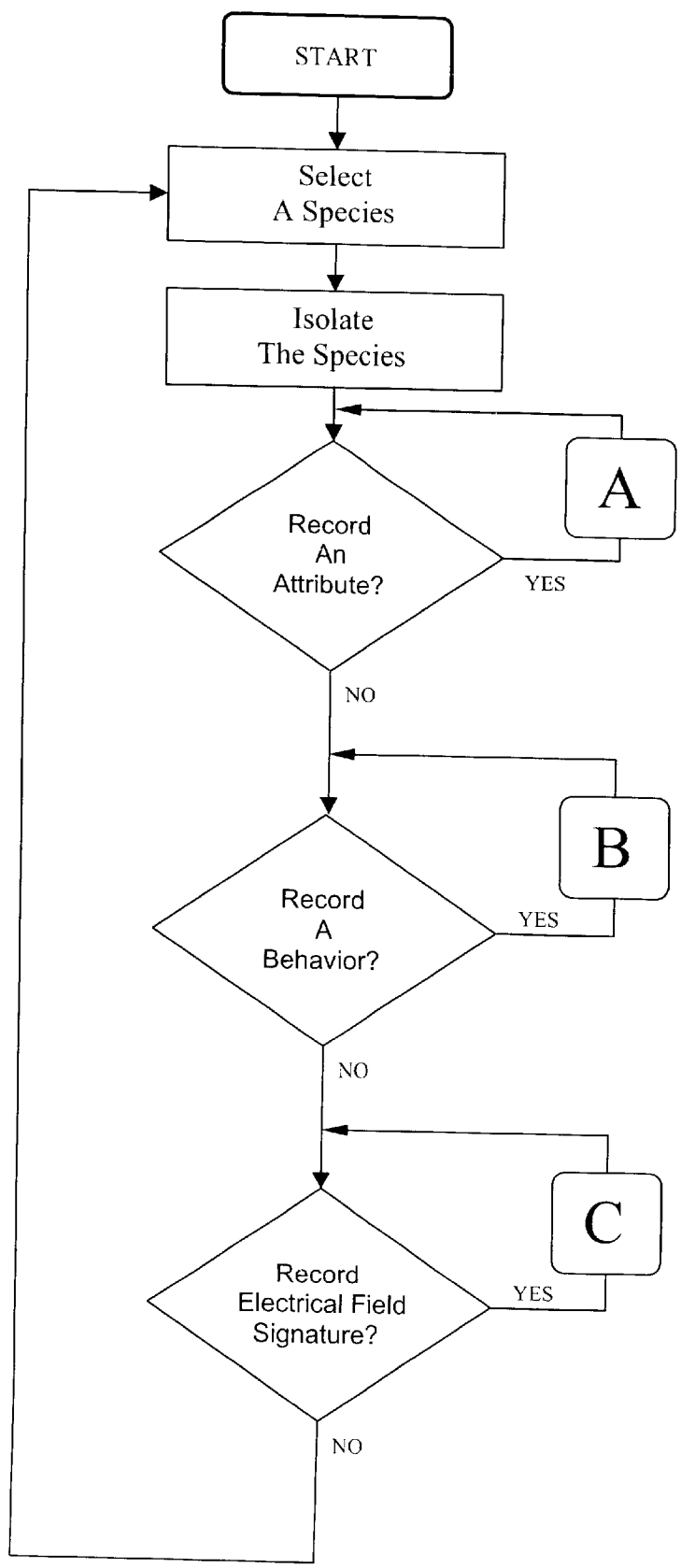
FIGS. 1–4 show flow charts of a method of creating a data structure according to the invention.
Figure 2:
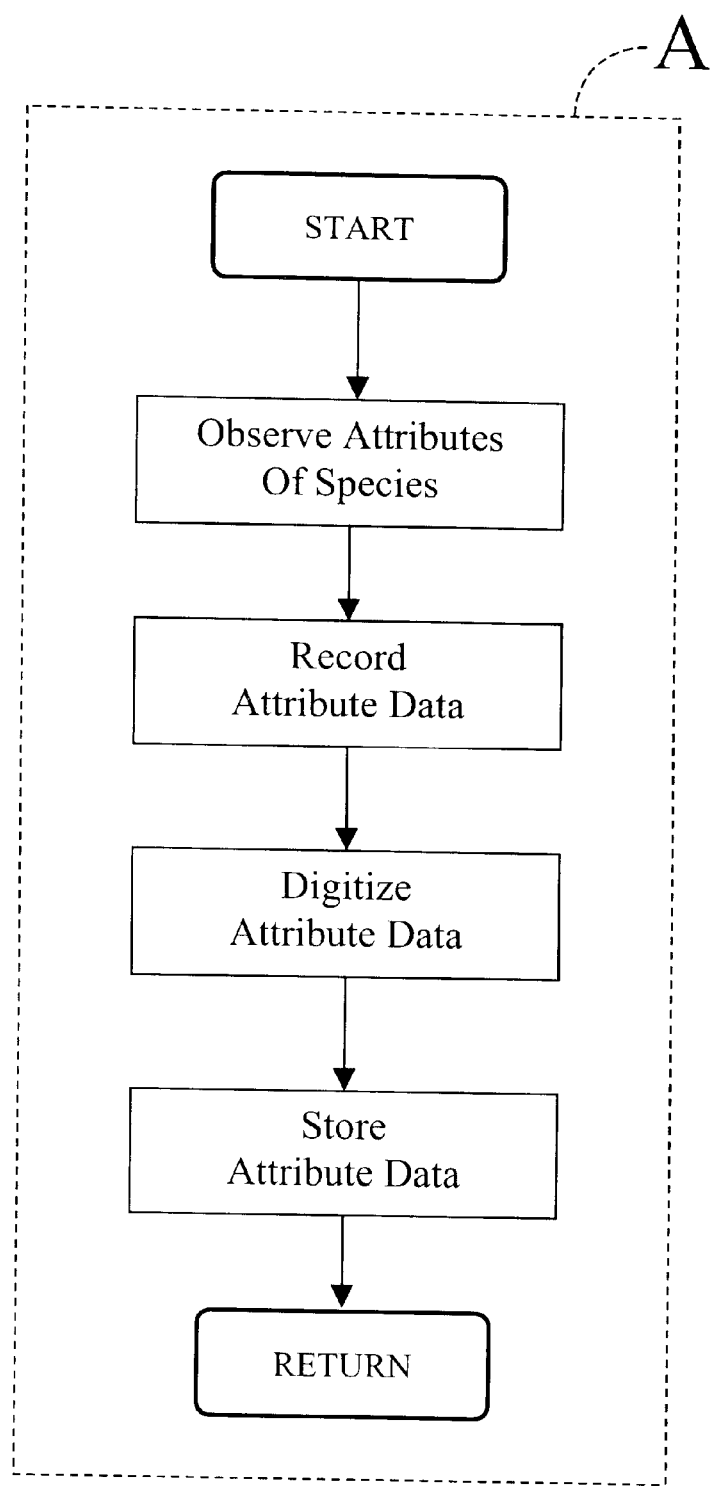
Figure 3:
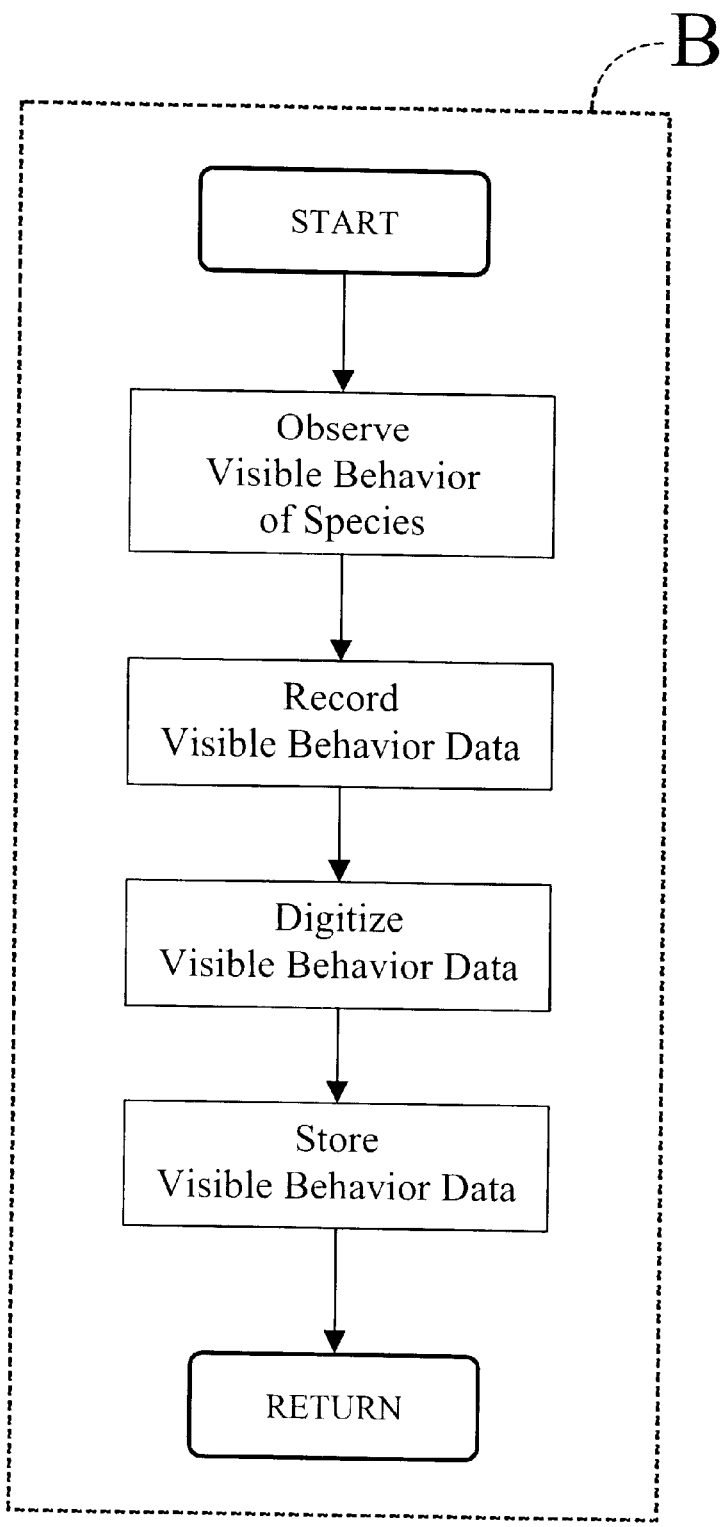
Figure 4:
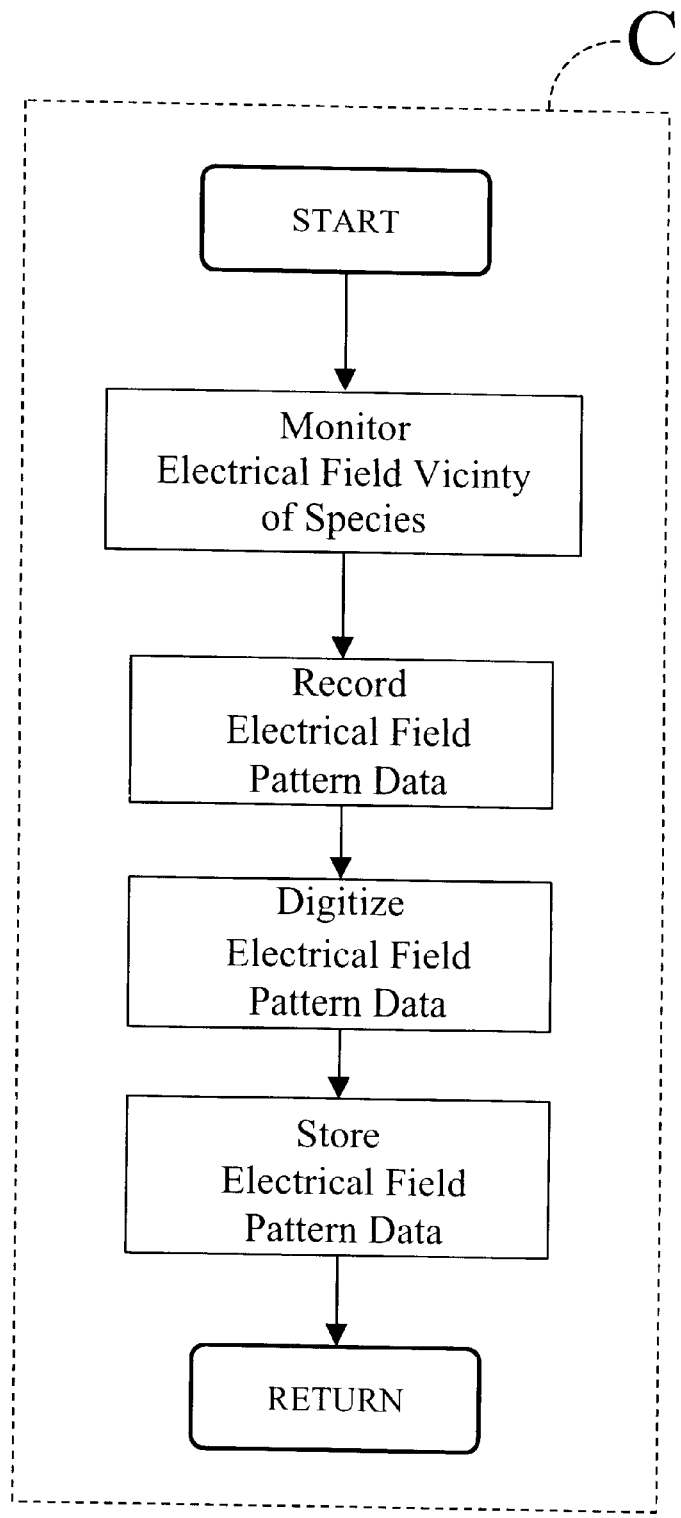

As shown in FIGS. 2, 3, and 4, each characteristic of the species (e.g. attribute data, visual behavior data, and electrical field signature) is observed, recorded (e.g. manually or electronically), digitized and then stored in a database for later editing and/or retrieval and use.

Figure 5:
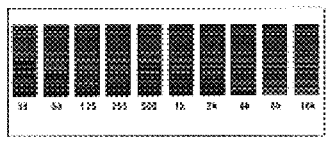
FIG. 5 illustrates a sample data structure according to the invention.
Figure 5:
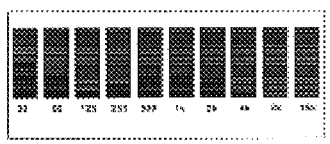
Figure 5:
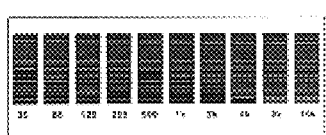

FIG. 5 depicts a preferred sample of a data structure in which the species' data could be stored. It should be understood, however, that the species' data can be stored in a variety of different data structures. First, the data structure identifies the species (e.g. "Species Name"). Next, the "Species Attribute Data" is stored therein. The "Visual Behavior Data" contains the type of visual behavior observed as well as an electronic reference to a memory location containing the actual "Electrical Signature Data" recorded by the galvanometer.

Figure 8:
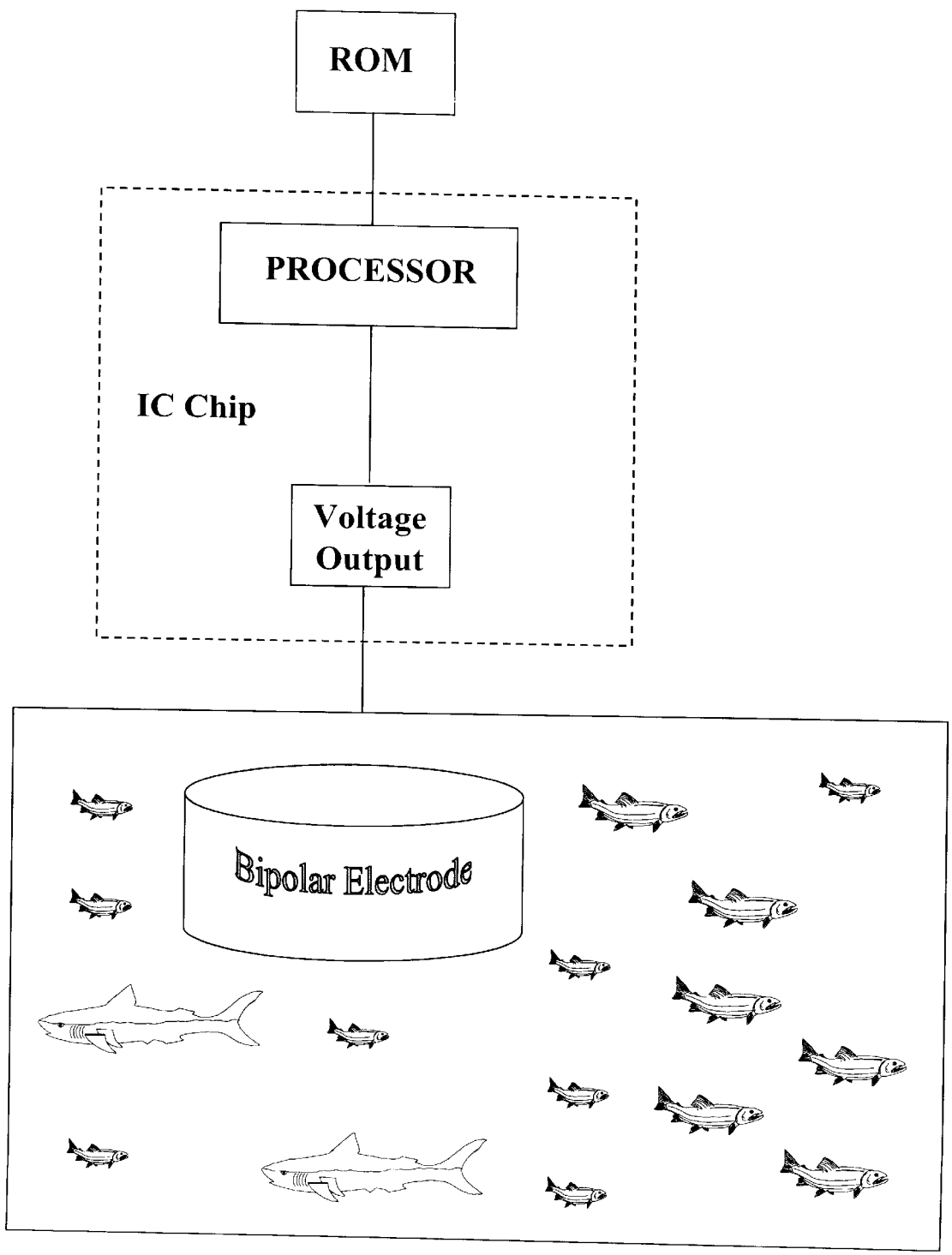
FIG. 8 is a schematic representation of an article according to the invention.

Now referring to FIG. 8, an illustration depicting a preferred apparatus for recreating the electrical field signatures is illustrated therein. Once the signals are recorded, they are studied for the specific indices that describe the signals associated with a certain behavior, activity, or event. The patterns, which will have been recorded in a digital format, are then applied in an apparatus capable of applying a voltage potential to an electrode or set of electrodes to recreate the recorded electrical field "signature" underwater.

In this manner, specific signatures can be applied in the presence of aquatic organisms to determine their ability to modulate or produce a desired response such as attraction, repulsion, fleeing, striking, feeding, reproductive behavior, etc. In the digital format, the signals can be enhanced or modified to remove background noise and/or to enhance the signature and improve the desired effect. The indices that define a signal that elicits a desired response are then placed in a digital memory (e.g. read only memory—ROM) and then can be used in applications underwater to modify the behavior of aquatic species.

In one embodiment, the memory chip is placed in a self contained, watertight body, along with circuitry to read the data and direct the electrical energy pulses to the electrical pole(s) in a manner which recreates the electrical field signature outside of the housing. The pole(s) or electrode(s) to which the electrical potentials are modulated can be placed inside or outside the housing. The housing can also represent a lure shape and have attached hooks for the purpose of catching fish. As an additional feature, the housing can be opened and the memory replaced in a pluggable fashion such that the same housing can be used for different signatures. In addition, multiple electrical field signatures can be represented in the memory and can be sequentially applied in a pre-programmed manner.

In another embodiment of the invention, the memories are stored in an onboard computer. Signatures associated with any of a number of desired behavior modifying electrical fields can be user selected from a menu and applied to an electrode or set of electrodes attached to the on board unit and then submerged into the water via an insulated cord for transmission of the electrical potentials. Alternatively, the electrode can be mounted to the boat hull. Alternatively, the electrode can be free to be placed in the water unattached to the control memory and circuitry. In this configuration, the signal is applied to the electrode by radio transmission to circuitry within a watertight housing containing the electrode(s) as well as a power source for pulsing the electrical potential signals to the electrode(s). In this manner the electrical field signature is modulated remotely.

Finally, since a method will be used to identify the indices that define the patterns of electrical fields associated with different species of aquatic organisms, these indices may be used to detect the presence of specific species in the vicinity of a Galvanometer placed in the water and coupled to a computer capable of collecting and analyzing the signals in comparison to known patterns associated with individual species.

Figure 7:
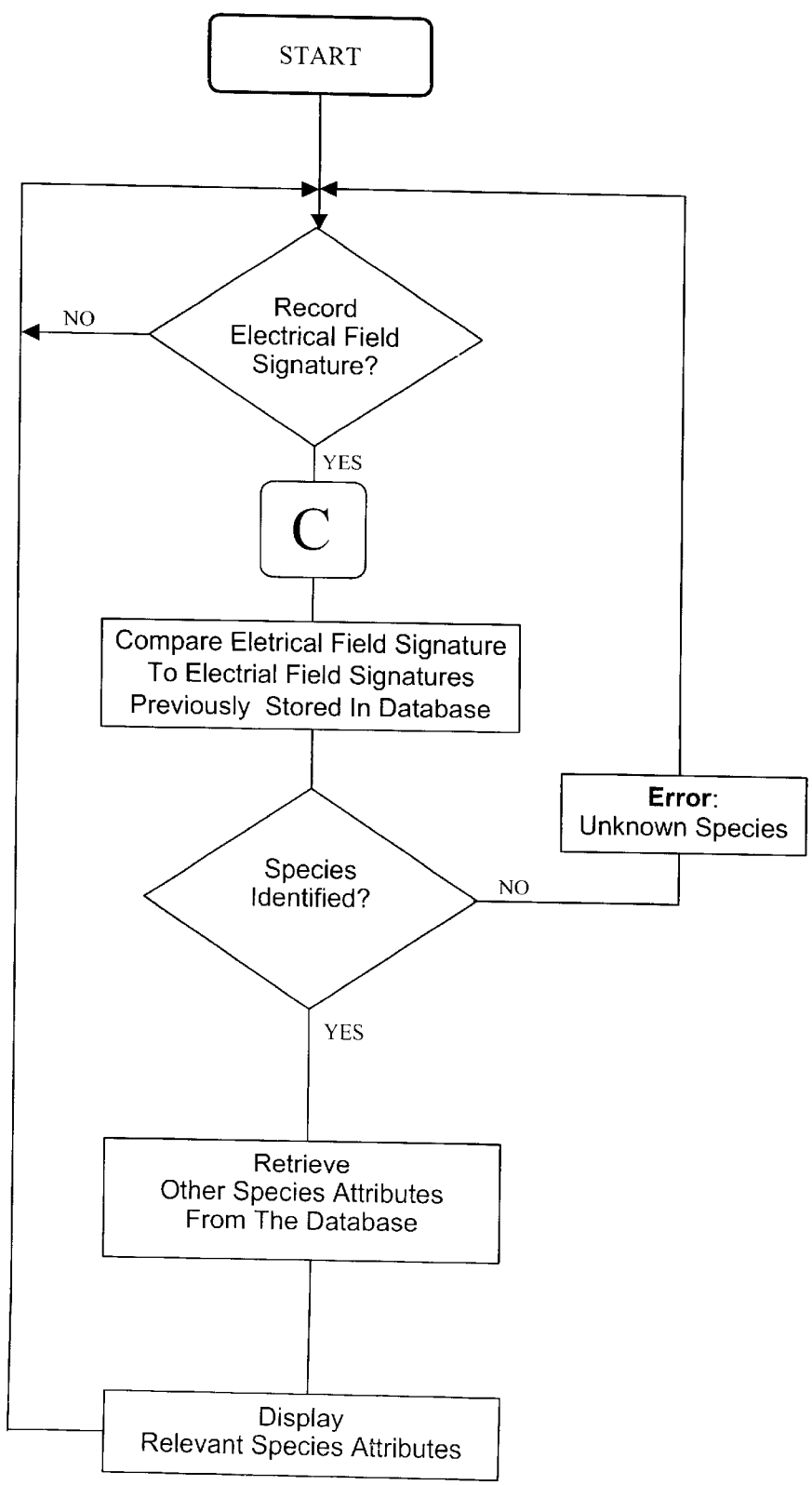
FIG. 7 is a flow chart of a process according to the invention carried out by the apparatus of FIG. 6.

Now referring to FIG. 7, a flowchart diagram depicting the logic flow of identifying a specific species in accordance with the present invention is illustrated therein. First, electrical field data is monitored and recorded as in FIG. 4. Next, the recorded electrical field signature is compared to the previously stored electrical field signatures of a variety of species. If a matching signature is found within the database records, then that species and/or its characteristics are displayed on an input/output device, such as a computer monitor and the like. If, however, a matching signature is not present within the database, the computer system returns an error message to the user that the present species is not identifiable given the know patterns.

Figure 9:
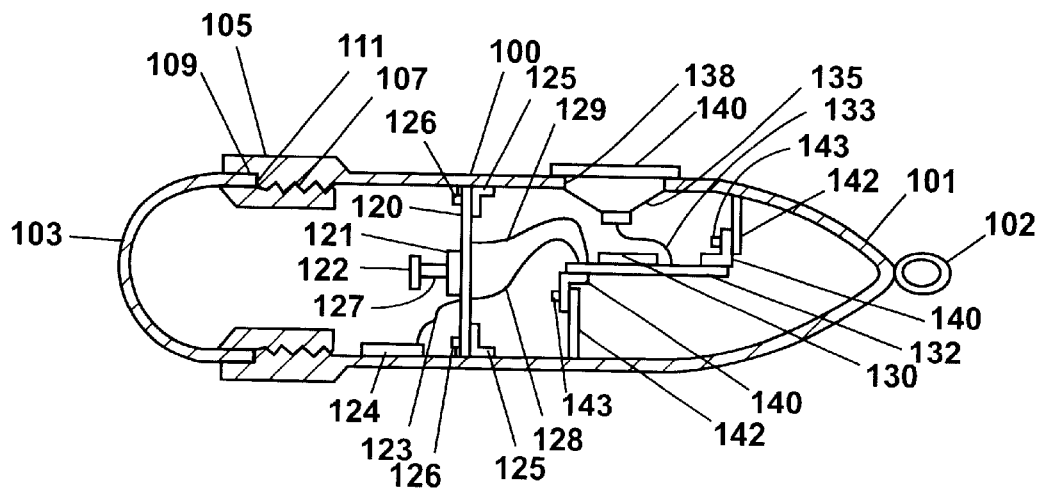
FIG. 9 is a longitudinal sectional view of a fishing lure incorporating the principles of their invention.

FIG. 9 is a sectional view of an illustrative embodiment of a device in the form of a fishing lure 100 for attracting fish by reproducing electrical field signatures underwater. Lure 100, which may be made of plastic or other suitable material, has a front section 101 and a rear section 103 and is provided with an attachment loop 102 for attachment to a fishing line. The lure will have one or more standard fish hooks (not shown) attached to it. Alternatively, the lure can have no hooks but instead provide one or more attachment loops for placing it "in-line" with a fishing line or tow line containing other lures or bait. The front section 101 has an area of increased diameter 105 provided with threads 107 formed around its circumference for receiving mating threads of the rear section 103. A watertight seal is obtained between the front and rear sections by means of an O-ring gasket 109 supported on a radially projecting shoulder 111 on the front section 101.

Contained within the front section 101 is a circuit board 120 having mounted thereon a pluggable read-only memory (ROM) 122. The circuit board 120 is provided with a connector 121, and ROM 122 is provided with external conductors 127 for pluggably engaging connector 121, allowing for convenient removal of ROM 122. Another ROM, defining the electrical field signature of another species of bait, or any another behavior modifying signature, may be readily inserted in connector 121 to cause the lure to reproduce the signature.

The circuit board may be fastened to brackets 125 by means of standard fasteners 126 which are readily accessible when the rear section 103 has been separated from the front section 101. A battery 124 is connected to circuit board 120 via conductor 123. The printed circuit board 120 is provided with conductors for making the necessary electrical connection to provide power from the battery 124 to ROM 122. Circuit board 120 has conductors which extend through circuit board 120, in a standard fashion, to make connection from conductor 123 to conductor 128 to provide power to integrated circuit 130 mounted on a second printed circuit board 132.

Printed circuit board 132 may be fastened by means of brackets 140 mounted on printed circuit board 132 to brackets 142 attached to the internal surface of the front section 101 by means of fasteners 143 in a standard fashion. Fastener 143 will be accessible when the rear section 103 and printed circuit board 120 have been removed. Connection is provided from ROM 122 to integrated circuit 130 via printed circuit boards 120 and 132 and interconnecting conductor 129. Further electrical connection is provided from integrated circuit 130 via printed circuit board 132 and conductor 133 to a pole or poles 150 used to create the electrical field either within or exterior to the housing. The external housing of the device may be constructed of material that shields the electrical fields produced by the battery, such that these electrical fields do not interfere with or obscure the electrical field signatures desired for creation outside the housing. In this embodiment, the electrical potentials are applied to poles that are exposed to the outside of the shielded housing at locations that produce the desired electrical field effects.

Figure 10:
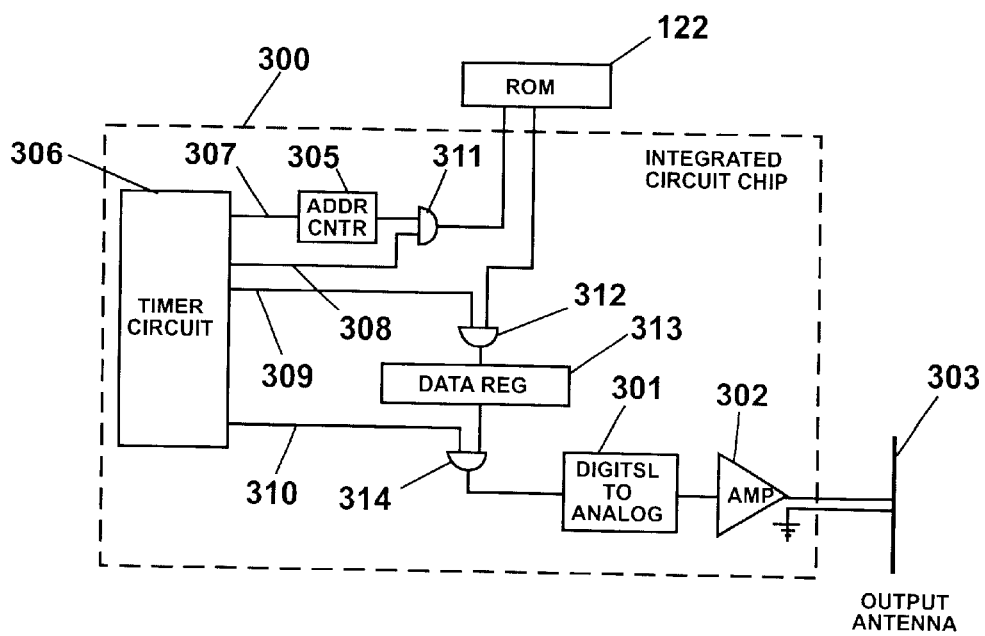
FIG. 10 is a block diagram representation of an illustrative circuit for reproducing underwater electrical field signatures from pre-recorded signals.

FIG. 10 illustrates diagrammatically the circuit details of circuitry for the production of underwater electrical field signals from recorded data as may be used in underwater housings described above with respect to FIGS. 1 and 3. A read-only memory, e.g., ROM 122, contains digital data representing the recorded electrical field signals or signature produced by aquatic species.

The digital data stored in the ROM 122 is read and converted to analog form by means of a digital-to-analog converter 301. The analog signal is amplified by means of a standard voltage amplifier 302 and applied for transmission to an electrode(s) 303 placed in the underwater environment. ROM 122 will normally have a plurality of memory locations, each having a data word comprising a plurality of bits, e.g., 8 bits. Each memory location is addressed by transmitting an address comprising the contents of address counter 305 to ROM 122. The number of data words in the ROM is a matter of design choice, but there should be sufficient data to represent a significant duration electrical field signature.

Furthermore, it may be desirable to store signature data for more than one aquatic species or behavior modifying signature in sequence. The address counter 305 is incremented periodically to sequentially cycle through all of the data locations in the ROM 122. Address counter 305 is a recirculating counter which will return to an all-zero state. Accordingly, the memory will be read in repetitive cycles. In this manner, the electrical field signal defined by the data in the memory will be broadcast repeatedly.

The address counter 305 is incremented from a commercially available timer circuit 306 which repetitively produces a number of clock pulses. Address counter 305 is incremented via address lead 307 by means of the T2 timing pulse. The T1 timing pulse is provided on lead 308 and applied to AND gate 311 together with the output of the address counter 305 to transmit an address to the ROM 122. Timing pulse T2 is transmitted via lead 309 to AND gate 312 which is activated by pulse T2 to gate a data word from ROM 122 to data register 313. Timing pulse T3 is applied via lead 310 to AND gate 314 to apply the data word stored in the data register 313 to the digital-to-analog converter 301. The rate of operation of timer circuit 306 is a matter of design choice, depending on the frequency at which data is to be read from memory, which in turn is a function of the frequency of sampling by which recorded data was generated. The circuitry shown within the dashed line box 300 may be included in a single integrated circuit chip or a plurality of chips mounted on a printed circuit board for ease of installation in the relatively small space of a lure.

Figure 11:
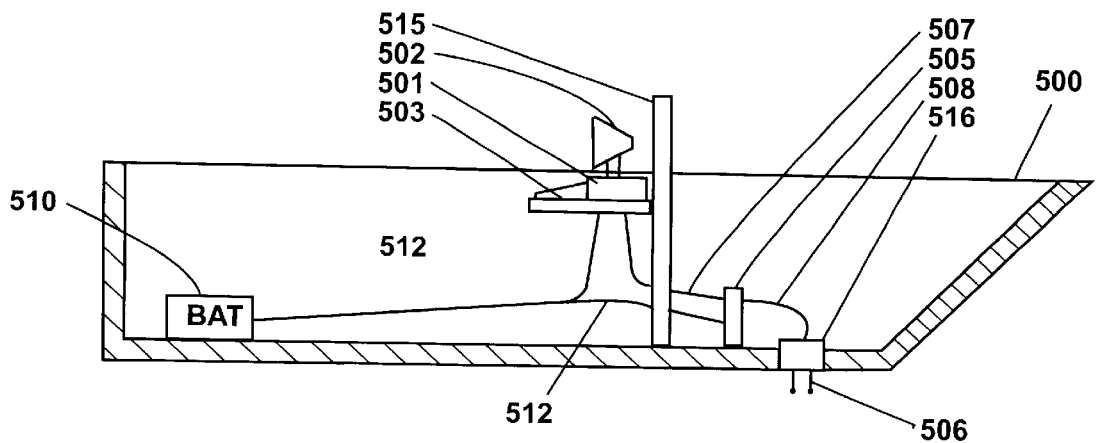
FIG. 11 is an alternate embodiment of the invention, employing an on-board computer.

FIG. 11 represents an embodiment of the invention in which the circuitry and equipment for reproducing electrical field signatures underwater are incorporated in a boat. The boat 500, the hull of which is shown in cross-sectional elevation, includes an onboard computer 501 provided with a display screen 502 and a keyboard 503. The computer 501, which may be any of a number of types of commercially available, relatively inexpensive computers, or may comprise circuitry such as that described above with respect to FIG. 10, will include a memory in which prerecorded data representing underwater electrical field signatures produced by aquatic species are stored. The computer reads the data from memory and transmits the data to interface circuit 505 via conductor 507. The interface circuit provides an electrical potential to an underwater electrical pole or set of poles 506 via conductor 508. A boat battery 510 provides power to the computer 501 and interface circuit 505 via conductors 512. The hull 500 is provided with a console 515 for supporting computer 501 and associated equipment. The electrical pole(s) 506 may be placed on the boat hull beneath the water line, or may be suspended or towed behind the boat by means of a watertight electrical cord for transmitting the electromotive forces to the electrode pole(s) in a modulated manner, thereby reproducing the selected electrical field signatures underwater.

Figure 12:
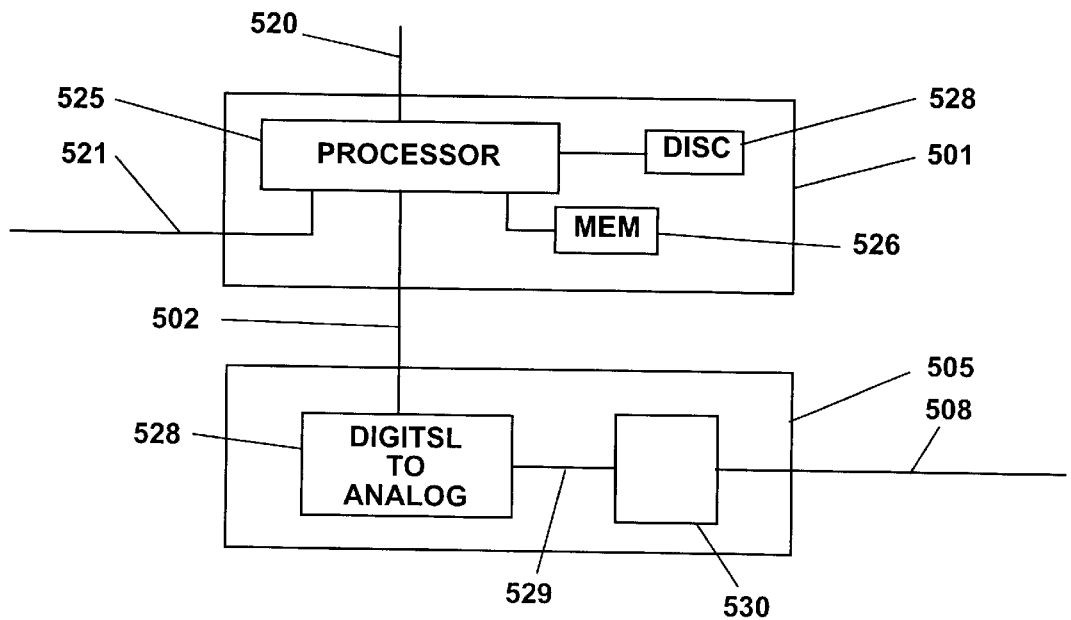
FIG. 12 is a block diagram representation of computer circuitry and interface circuitry for use with the computer arrangement of FIG. 11.

FIG. 12 is a block diagram representation of circuitry within a computer 501 and the interface 505. The computer 501 comprises a processor 525 and an associated memory 526. A disk store 528, which for example may be a standard floppy disk, is connected to the processor 525. The floppy disk may be loaded with data representing electrical field signals recorded from aquatic species and a program for reading the data, described later herein with respect to FIG. 8. The information from the disk store 528 may be loaded in the memory 526 in a standard manner and the data representative of electrical field signatures is read from the memory 526 and transmitted to a digital-to-analog converter 528 in interface 505 by means of conductor 502. The digital-to-analog converter is a standard device that, upon receipt of a data word, generates an analog output signal that is transmitted to a voltage amplifier 530 via conductor 529. The amplified voltage is transmitted via conductor 508 to electrode(s) pole 506.

Advantageously, the arrangement of this embodiment employing an on-board computer eliminates a number of the constraints encountered when the system is embodied in an underwater housing such as a lure or the like. By using the on-board equipment, no separate battery is required since the boat battery can be used and plenty of power will be available to drive the circuitry.

Furthermore, the interface circuitry 505 may be constructed of discrete components which are generally less expensive than specially fabricated integrated circuitry. The electrical pole(s) 506 may essentially be made as large as is desirable to broadcast the electrical field signals underwater over a large area. A number of such electrodes may be positioned in various places in or on the boat when desired.

The circuitry on board may be either the computer-implemented arrangement shown in FIGS. 11 and 12 or the circuitry depicted for example in FIG. 10.

In either case, a significant advantage of having the electronic circuitry on board is that the user may obtain different electrical field signatures from a memory. Furthermore, the memory device is readily replaced to allow the broadcasting of different sets of signatures in both the computer-implemented and the hard-wired configuration.

In the computer-implemented configuration shown in FIG. 11, a fisherman inserts a floppy disk which contains data representative of one or more electrical field signatures of aquatic species. Different species of game fish have a preference for different species of bait and hence the floppy disk may include a program which provides a menu to the fisherman on the display screen 502 allowing the fisherman to select the game fish, by pressing a key on keyboard 503 or other input device.

Reasonable variation and modification are possible within the scope of the foregoing disclosure and drawings without departing from the spirit of the invention.

What is claimed is:

1. A device for recreating complex and changing electrical fields representative of specific behavior modifying events of underwater species comprising:
    a data structure having fields corresponding to certain visible behavior of a selected species and electrical field data related to the visible behavior of the species;
    a memory having at least one digital record in the form of the data structure storing visible behavior and electrical field data for at least one species.

2. The device of claim 1 wherein the data structure is embodied into a chip which is mounted into a sealed housing.

3. The device of claim 2 wherein the sealed housing is waterproof.

4. The device of claim 2 wherein the sealed housing is in the form of a fishing lure.

5. The device of claim 2 wherein the sealed housing has hooks attached to it.

6. The device of claim 2 wherein the chip is in the form of a plug which can be interchangeable in the sealed housing to accommodate different data structures in the housing as desired.

7. The device of claim 2 wherein the chip includes a circuit to periodically read the data in the data structure and to generate a signal representative of the changing electrical fields related to a certain type of behavior of the underwater species.

8. The device of claim 7 wherein the circuit includes electrodes which are adapted to detect and to generate the signal representative of the changing electrical fields related to a certain type of behavior of the underwater species.

9. The device of claim 8 wherein the electrodes are responsive to the signal to recreate the electrical field signature either within or outside of the housing, and within the aquatic environment.

10. The device of claim 1 wherein the data structure is incorporated into a read only memory in a computer that can be carried by a watercraft.

11. The device of claim 1 and further comprising at least one electrode and a computer, wherein the at least one electrode are operably connected to the computer to detect electrical field signatures in the vicinity of an underwater species.

12. The device of claim 11 wherein the computer includes a comparator to compare electrical field patterns detected by the electrodes with the stored electrical field signatures in the memory.

13. The device of claim 12 wherein the device further includes an output device to identify those species for which the detected electrical field signatures match the electrical field signatures in the data structure.

14. The device of claim 12 wherein the computer has circuitry to read the at least one electrode and to generate signals representative of certain electrical field signatures of a particular underwater species.

15. The device of claim 14 wherein the circuitry applies the generated signals to the at least one electrode to recreate the electrical field signature of a desirable species underwater.

16. The device of claim 14 wherein behavior modifying electrical field patterns are discovered by placing the at least one electrode in an underwater environment in the vicinity of a desired species of at least one aquatic organism.

17. The device of claim 11 wherein electromotive potentials are applied to the at least one electrode in either randomly selected or in predefined patterns representing modulated pulses to the at least one electrode and thereby resulting in a changing underwater electrical field in the vicinity of the at least one electrode and an isolated species.

18. The device of claim 11 wherein the computer is interconnected to the at least one electrode by a wireless connection.

19. The device of claim 11 wherein the at least one electrode comprises one of a monopole, dipole and multi-pole circuitry for emitting electrical fields.

20. The device of claim 11 wherein the device farther comprises an external housing constructed of material that shields the device from undesirable electrical fields such as those produced by a power source for the device whereby the undesirable electrical fields do not interfere with or obscure desired electrical field signatures.

* * * * *